United States Patent [19]
Molin et al.

[11] Patent Number: 5,253,517
[45] Date of Patent: Oct. 19, 1993

[54] FLOW CONVERTER

[75] Inventors: Marek Molin, Neutraubling; Andreas Wildgen, Nittendorf/Haugenried, both of Fed. Rep. of Germany

[73] Assignee: Siemens Aktiengesellschaft, Munich, Fed. Rep. of Germany

[21] Appl. No.: 16,662

[22] Filed: Feb. 10, 1993

Related U.S. Application Data

[63] Continuation of Ser. No. 707,636, May 30, 1991, abandoned.

[30] Foreign Application Priority Data

May 30, 1990 [EP] European Pat. Off. ......... 90110285.5

[51] Int. Cl.$^5$ ............................................. G01F 15/00
[52] U.S. Cl. .................................................. 73/118.2
[58] Field of Search ................ 73/118.2, 198, 204.21, 73/861.22; 137/2, 8; 138/37, 39–41, 44

[56] References Cited

U.S. PATENT DOCUMENTS

| | | | |
|---|---|---|---|
| 2,929,248 | 3/1960 | Sprenkle | 73/198 |
| 2,957,308 | 10/1960 | McMurtrey et al. | 138/41 |
| 3,244,002 | 4/1966 | Prono et al. | 73/198 |
| 3,645,133 | 2/1972 | Simeth et al. | |
| 3,965,730 | 6/1976 | Innes | 73/118.2 |
| 4,142,413 | 3/1979 | Bellinga | 73/198 |
| 4,280,360 | 7/1981 | Kobayashi et al. | 73/198 |
| 4,594,888 | 6/1986 | DeBaun et al. | 73/198 |
| 4,759,213 | 7/1988 | Porth et al. | 73/118.2 |

FOREIGN PATENT DOCUMENTS 2434374 3/1980 France.

OTHER PUBLICATIONS

Fisita Congress Report 1986, No. 865078, pp. 3.125–3.131: Härtel et al.
Messen & Prüfen, No. 12 Dec. 1985, pp. 668–671: Hohenstatt et al.

*Primary Examiner*—Robert Raevis
*Attorney, Agent, or Firm*—Herbert L. Lerner; Laurence A. Greenberg

[57] ABSTRACT

A flow converter for an air flow rate meter, especially for an intake conduit of an internal combustion engine, includes a plastic flow rectifier for converting an aspirated air mass into a laminar air flow moving in a given flow direction. The flow rectifier includes a honeycomb body and a ring integral with the honeycomb body. The honeycomb body has a surface disposed at right angles to the given flow direction and the ring protrudes out of the surface. A grid is permanently secured to the flow rectifier for generating microscopic eddies in the laminar air flow. A method for producing a flow converter for an air flow rate meter includes integrally injection molding a thermoplastic flow rectifier for converting an aspirated air mass into a laminar air flow moving in a given flow direction. The flow rectifier includes a honeycomb body having a surface disposed at right angles to the given flow direction and a ring protruding out of the surface. The grid is permanently secured to the flow rectifier for generating microscopic eddies in the laminar air flow.

7 Claims, 4 Drawing Sheets

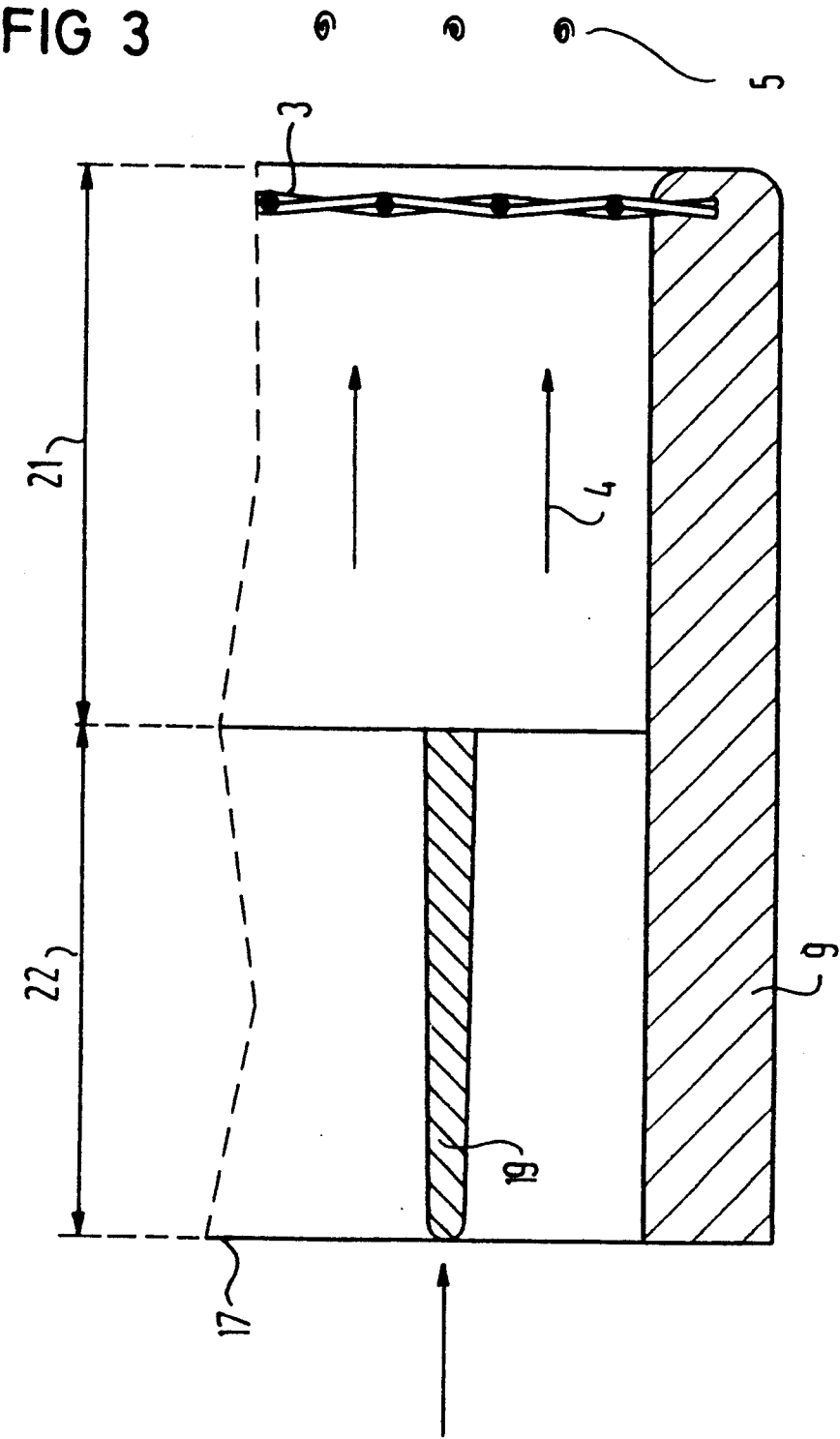

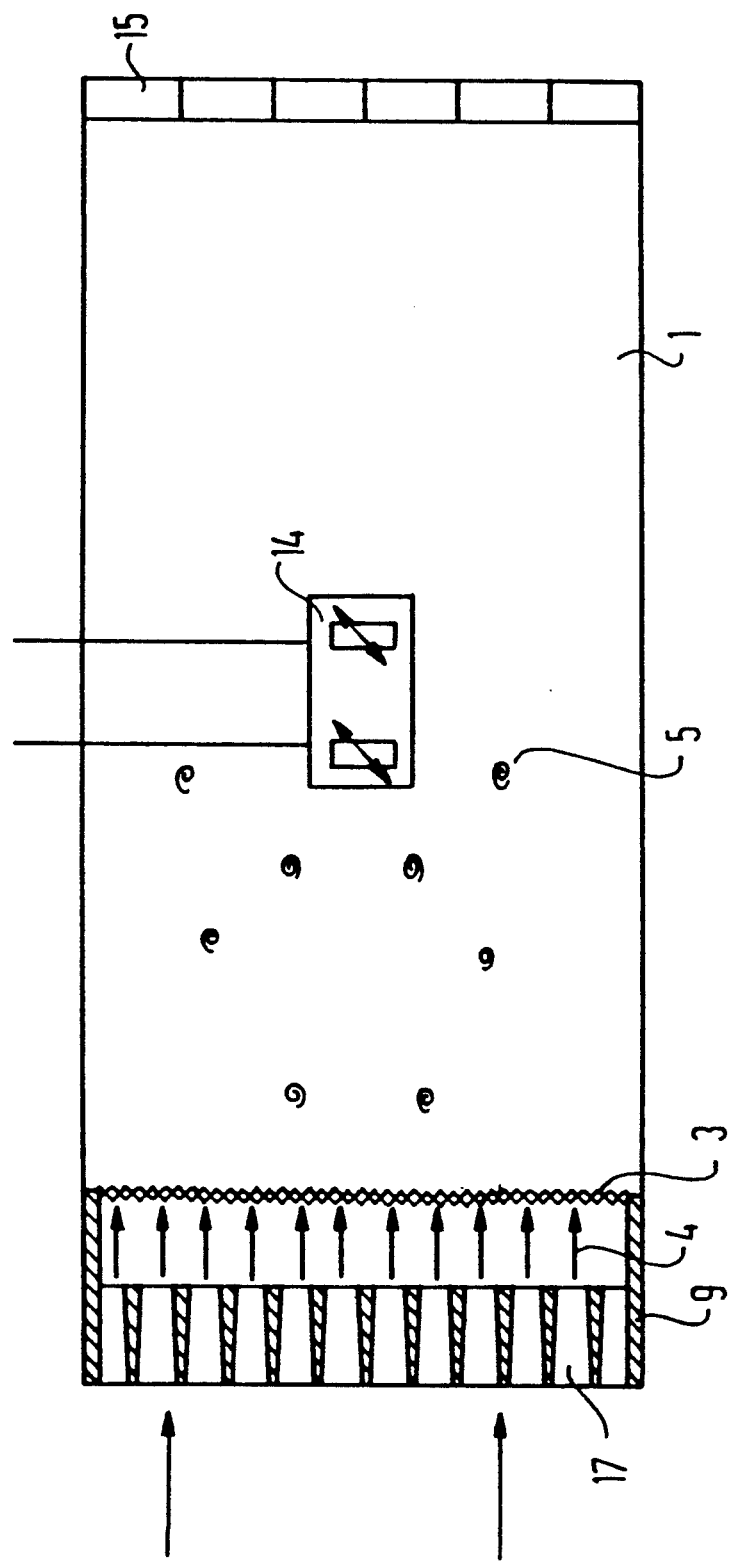

FLOW CONVERTER

This application is a continuation of application Ser. No. 07/707,636, filed May 30, 1991, now abandoned.

The invention relates to a flow converter for an air flow rate meter, for instance for an intake conduit of an internal combustion engine, including a flow rectifier in which an aspirated air mass is converted into a laminar air flow, and a grid with which microscopic eddies are generated in the laminar air flow. The invention also relates to a method for producing the flow converter.

Such a flow converter is described in an article entitled Entwicklung eines neuen elektronischen Gemischbildungssystems [Development of a New Electronic Mixture Forming System] by G. Härtel, W. Jordan and E. Schulte, in Fisita Congress Report 1986, No. 865078, Belgrade. In that device, microscopic eddies are generated by means of a grid that is disposed between a flow rectifier and an air flow rate meter, in order to stabilize the measurement signal. The flow rectifier and the grid are two separate structural parts, which must be inserted into the intake conduit while being spaced apart from one another and aligned accurately with respect to the air flow rate meter. If that is not done, the pressure through the flow converter is lowered, and the signals measured at the air flow rate meter are too widely scattered.

It is accordingly an object of the invention to provide a flow converter, which overcomes the hereinafore-mentioned disadvantages of the heretofore-known methods and devices of this general type and to do so in such a way that the aspirated air undergoes a lesser pressure loss, with a simultaneously slight scattering of the air flow rate meter signals.

With the foregoing and other objects in view there is provided, in accordance with the invention, a flow converter for an air flow rate meter, especially for an intake conduit of an internal combustion engine, comprising a plastic flow rectifier for converting an aspirated air mass into a laminar air flow moving in a given flow direction, the flow rectifier including a honeycomb body and a ring integral with the honeycomb body, the honeycomb body having a surface disposed at right angles to the given flow direction, and the ring protruding out of the surface; and a grid being permanently secured to the flow rectifier for generating microscopic eddies in the laminar air flow.

In accordance with another feature of the invention, the honeycomb body has honeycomb walls with constant trapezoidal cross-sectional areas as seen in the given flow direction at each point along the honeycomb body.

In accordance with a further feature of the invention, the honeycomb body has rounded upstream edges.

In accordance with an added feature of the invention, the honeycomb body has a maximum width of substantially 5 mm.

In accordance with an additional feature of the invention, the grid and the honeycomb body are spaced apart by a distance of at least 1 mm.

In accordance with yet another feature of the invention, the grid is formed of a low-activity metal i.e. a metal which is highly resistant to chemical reactions.

In accordance with yet a further feature of the invention, the flow rectifier includes centering and fixation elements.

With the objects of the invention in view, there is also provided a method for producing a flow converter for an air flow rate meter, especially for an intake conduit of an internal combustion engine, which comprises integrally injection molding a thermoplastic flow rectifier for converting an aspirated air mass into a laminar air flow moving in a given flow direction, the flow rectifier including a honeycomb body having a surface disposed at right angles to the given flow direction and a ring protruding out of the surface; and permanently securing a grid to the flow rectifier for generating microscopic eddies in the laminar air flow.

In accordance with another mode of the invention, there is provided a method which comprises calendering the grid.

In accordance with a concomitant mode of the invention, there is provided a method which comprises embedding the grid in the ring of the flow rectifier in a heated state.

For instance, the flow rectifier may be fabricated by injection molding. Injection molding can be used to make any arbitrarily shaped honeycomb body which is suitable for the purpose. Another advantage of the invention is that because of the manufacturing method being used, the flow rectifier lends itself to mass production and is very economical. The grid is made from a low-activity metal. As a result, the plastic of the flow rectifier is protected against thermal factors, such as backfiring from the combustion chamber of the engine. Since the grid is permanently secured to the flow rectifier, storage of the flow converter is simpler. It is also unnecessary to provide a socket ring around the grid, which is used for mounting in the intake conduit in the known flow converter.

Other features which are considered as characteristic for the invention are set forth in the appended claims.

Although the invention is illustrated and described herein as embodied in a flow converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 3 is a longitudinal-sectional view of the flow converter of FIG. 1; and

FIG. 4 is a longitudinal-sectional view of the intake conduit in which the flow converter of FIG. 1 is disposed.

Figure 1:
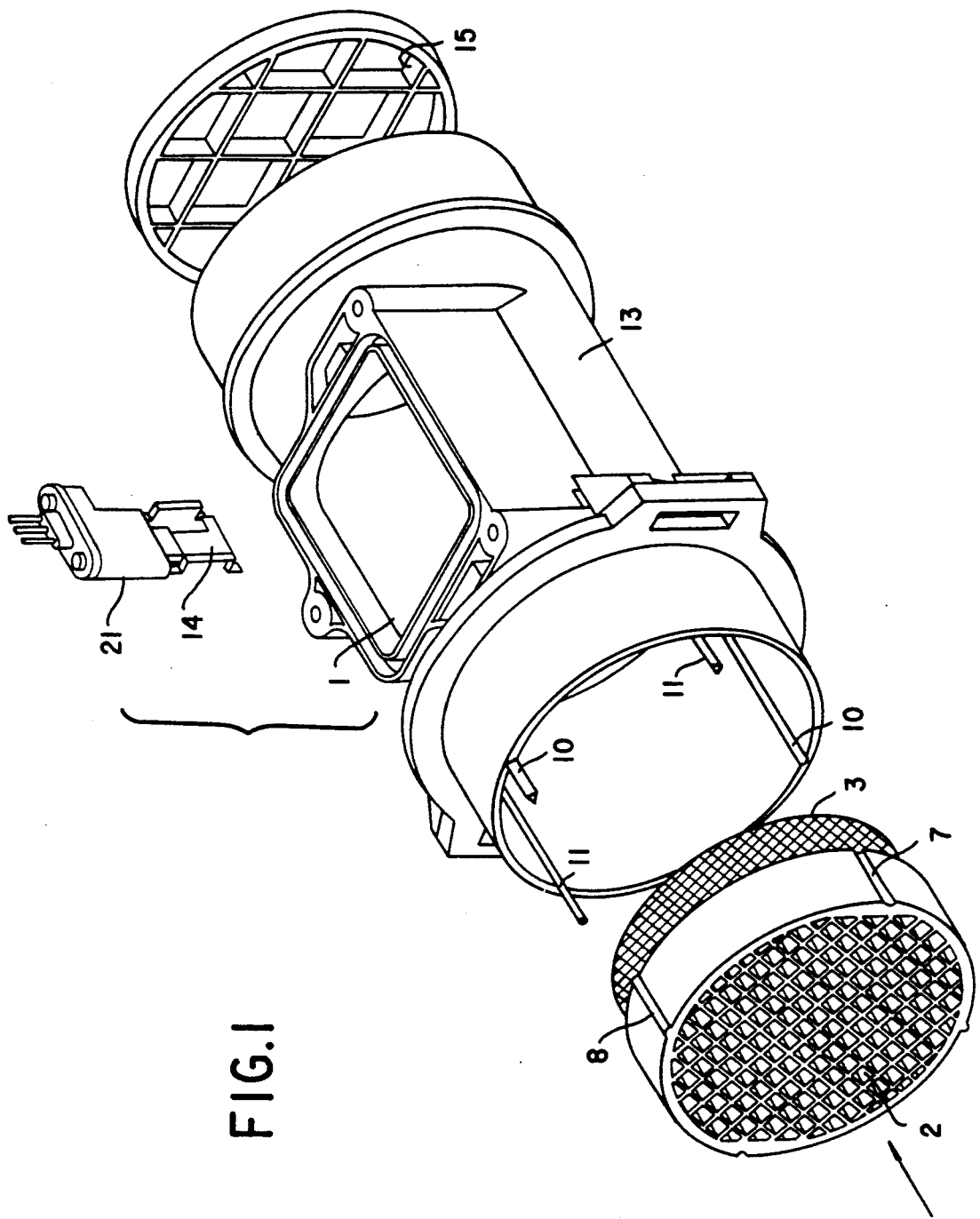
FIG. 1 is an exploded, diagrammatic, perspective view of a flow converter according to the invention, including a flow rectifier and a grid, along with an air flow rate meter disposed in an intake conduit of an internal combustion engine.

Referring now to the figures of the drawing in detail and first, particularly, to FIG. 1 thereof, there is seen an exploded view of a flow converter, which includes a flow rectifier 2 and a grid 3 and is located on the upstream end of an intake conduit 1. A flow of air aspirated by an internal combustion engine is converted by the flow rectifier 2 into a laminar air flow 4, as seen in FIG. 4. The air indicates the direction of the flow. Microscopic eddies 5 are generated by the grid 3 which is downstream of the flow rectifier 2. The flow rectifier 2 and the grid 3 are centered and fixed in the in conduit 1 during assembly by means of grooves 7 and which are integrated into a ring 9, and further grooves 10 and ribs 11 which are located in a housing 13. In the present exemplary application, there are two mutually opposed grooves 7 and two mutually opposed ribs 8 in the ring 9. The housing 13 is correspondingly provided with two grooves 10 and two ribs 11.

An air flow rate meter 14 which is located downstream of the grid 3 and parallel to the flow direction in the intake conduit 1, serves the purpose of direct load detection for an engine control system. The air flow rate meter 14 operates according to the principle of a hot-film anemometer. For the sake of attaining the highest possible measuring accuracy and signal stability, a plurality of microscopic eddies 5 must sweep over the active phase of a hot-film resistor and a comparison resistor. The current for generating a constant temperature increase of the hot-film resistor is a measure of the flow of air that passes through. The air flow rate meter 14 must therefore be located in the vicinity of the microscopic eddies 5.

A protective grid 15 is located on the downstream end of the intake conduit 1 and is intended to protect the air flow rate meter 14 against mechanical factors, for instance against being directly touched by a hand. The protective grid 15 is manufactured with a large enough mesh to ensure that it does not markedly affect either the measuring accuracy of the air flow rate meter 14 or the flow of air.

Figure 2:
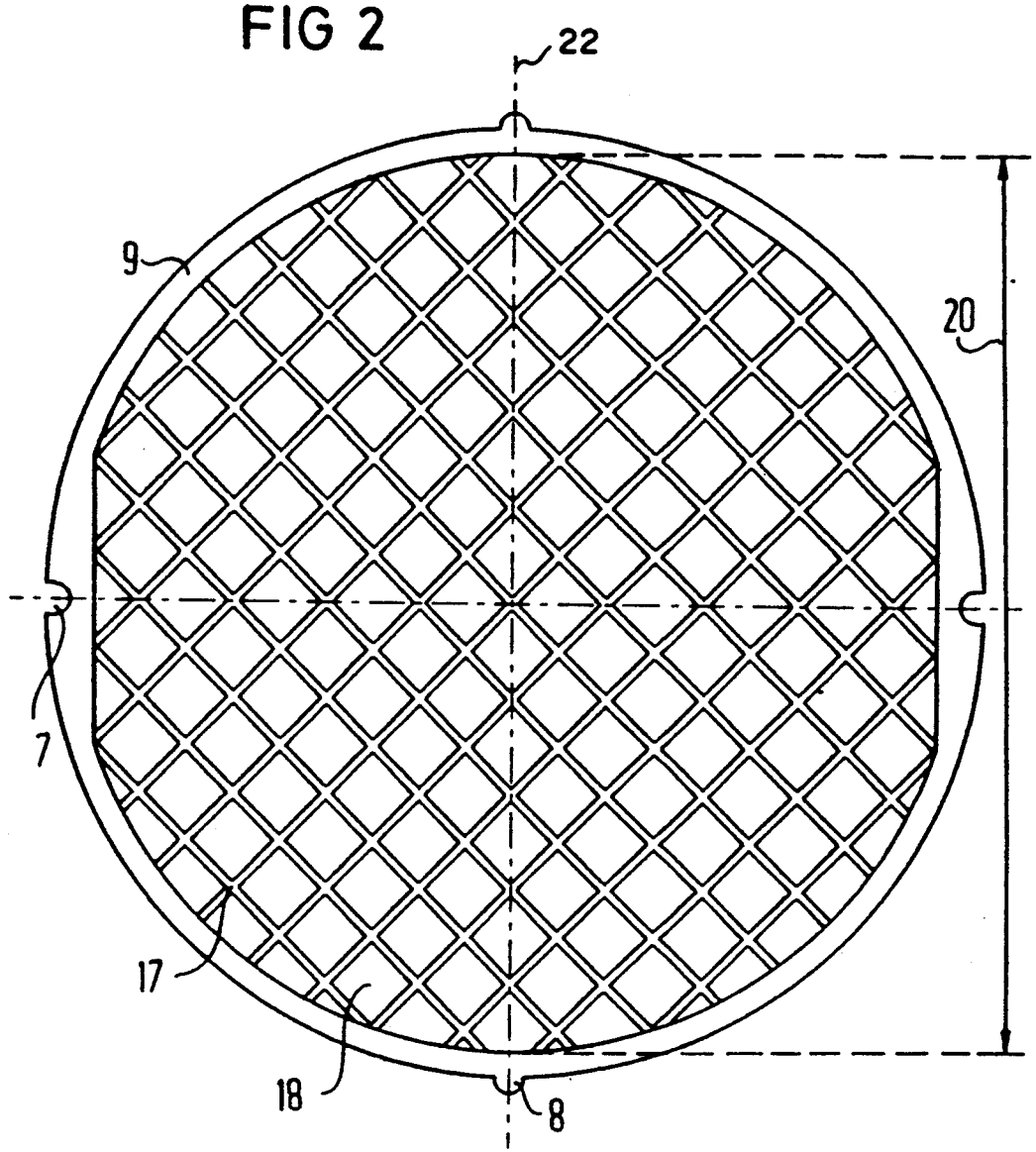
FIG. 2 is an enlarged cross-sectional view of the flow rectifier of FIG. 1, which is formed of a honeycomb body and a ring.

As seen in FIG. 2, the flow rectifier 2 includes a honeycomb body 17 and a ring 9. The honeycomb body 17 is constructed of square honeycomb cells 18. The honeycomb width, in other words the spacing from one honeycomb wall 19 seen in FIG. 3 to another, is approximately 4 mm for the downstream edge. For other applications, it is advantageous to reduce this honeycomb width. The cross-sectional area of the honeycomb cells remains constant over the entire cross section of the flow rectifier 2.

The ratio between the honeycomb width and the wall thickness is a compromise between the signal stability of the air flow rate meter 14 and the pressure loss caused by the flow rectifier 2. The diameter 20 of the honeycomb body 17 is constructed in accordance with the engine and depends on the aspirated air mass. In this particular case the diameter 20 is approximately 63 mm.

Upon assembly, the flow converter is thrust into the housing 13 along the grooves 10 until the ribs 11 protrude past the grooves 7. The ribs 11 are then deformed in such a way as to fix the flow converter in the intake conduit 1. The honeycomb body 17 is flattened in the region surrounding the groove 7, so that the ring 9 can be reinforced at that point.

In the case of the air flow rate meter 14 being used in this case, the signal scattering is least if the angle between the diagonals 22 of the rectangles forming the honeycomb cells 18 and the edge surface 21 of the air flow rate meter 14 is approximately 0°. The active surface of the air flow rate meter is disposed parallel to the axis of the intake conduit 1. In other air flow rate meters 14 that can be used along with the flow converter, the signal scattering may be least at an angle of approximately 45°. In the present case, the position of the ribs 8 and the grooves 7 on the ring 9 is selected in such a way that upon assembly, a diagonal across the rectangle of the honeycomb cells 18, extends parallel to the air flow rate meter 14 that is located downstream.

Polybutylene terephthlate (PBTP) is used in this case as the material for the flow rectifier 2, because PBTP is heat-resistant for short periods up to approximately 215° C. and can be processed very well to make injection-molded parts. For other exemplary embodiments, other plastics may be used that are suitable for injection molding and meet the requirements in terms of their use. For temperatures higher than 215° C., the plastic must be thermoplastic, in order to permanently connect the grid 3 to the flow rectifier 2.

The flow rectifier 2 must have the lowest possible air resistance. For this reason, a sprue created in the injection molding process must be removed. Particular attention must be paid in this respect to a central region having a diameter of approximately 20 mm about the axis of the intake conduit 1, since the air that flows through this region sweeps over the air flow rate meter 14.

The cross section of a honeycomb wall 19 seen in FIG. 3 is constant over the entire honeycomb body 17 and is trapezoidal in shape. The wall thickness increases in the flow direction and is approximately 0.6 mm at its thickest point. The arrows in FIG. 3 indicate the flow direction. The upstream edge is rounded. The downstream edge must be sharp-pointed, so that the flow can tear off cleanly, without forming eddies.

A spacing 21 of approximately 1 mm between the grid 3 and the honeycomb body 17 is adequate for producing the microscopic eddies 5. In this exemplary embodiment, the least signal scattering at the air flow rate meter 14 is achieved if the spacing 21 is approximately 7 mm.

A special steel is preferably used for the grid 3, which in this case is a chromium-nickel steel (X5CrNi1810), for example. The special steel offers protection for the honeycomb body 17 against thermal factors in the case of backfiring from the combustion chamber of the engine, and it is resistant to such environmental factors as dirt and moisture in the air. The grid 3 is "hot-embedded" in the ring 9. In other words, prior to the mounting of the flow converter in the intake conduit 1, grid 3 is heated and forced into the ring 9 of the flow rectifier 2. In this way, the grid 3 maintains the fixed spacing 21 with respect to the flow rectifier 2.

In order to keep the pressure loss and signal scattering as low as possible, the wires of the grid 3 must be embedded in alignment with the honeycomb walls 19. The grid 3 is calendered before it is joined to the flow rectifier 2. In other words, the grid is rolled in such a way that the wires of the grid cannot shift relative to one another. The spacings from wire to wire of the grid 3 depend on the pressure loss and on the microscopic eddies 5 to be produced. In this case, the spacings are approximately 1 mm, for a wire thickness of approximately 0.2 mm.

In the present flow converter, the pressure loss is less than 12 hPa, and the signal scattering is a maximum of ±3.5% of the flow of air. The depth 22 of the honeycomb body 17 represents a compromise between low signal scattering and high production cost for the flow rectifier 2. The depth 22 should be greater than 5 mm, in order to produce a satisfactory laminar air flow 4. In this particular case the depth 22 is approximately 7 mm. In other exemplary embodiments, a greater depth 22 may be advantageous.

FIG. 4 in particular shows the location of the air flow rate meter 14 in the vicinity of the microscopic eddies 5. The grid 3 located downstream of the flow rectifier 2 generates microscopic eddies 5 in the laminar air flow 4, which assure the most accurate possible measurement of the flow of air.

The term "intake conduit" also includes intake conduits having some arbitrary cross section other than round. The same is correspondingly true for the cross section of the flow rectifier.

We claim:

1. A flow converter for an air flow rate meter, comprising:

a plastic flow rectifier for converting an aspirated air mass into a laminar air flow moving in a given flow direction, said flow rectifier including a honeycomb body and a ring integral with said honeycomb body, said honeycomb body having a surface disposed at right angles to said given flow direction, and said ring including a portion protruding out of said surface; and a grid being permanently secured to the protruding portion downstream of said flow rectifier for generating microscopic eddies in the laminar air flow; and said flow rectifier further including means for securing a predetermined angle between said honeycomb body and an edge surface of the air flow rate meter and fixing said flow rectifier in alignment with the air flow rate meter said means including elements that individually both center and fix the flow rectifier relative to the air flow rate meter.

2. The flow converter according to claim 1, wherein said honeycomb body has honeycomb walls with constant trapezoidal cross-sectional areas as seen in said given flow direction at each point along said honeycomb body.

3. The flow converter according to claim 2, wherein said honeycomb body has rounded upstream edges.

4. The flow converter according to claim 3, wherein said honeycomb body has a maximum width of substantially 5 mm.

5. The flow converter according to claim 4, wherein said grid and said honeycomb body are spaced apart by a distance of at least 1 mm.

6. The flow converter according to claim 5, wherein said grid is formed of a metal being highly resistant to chemical reactions.

7. In a motor vehicle having an internal combustion engine with an intake conduit and an air flow rate meter in the intake conduit, the improvement comprising a flow converter for the air flow rate meter including a plastic flow rectifier for converting an aspirated air mass into a laminar air flow moving in a given flow direction, said flow rectifier including a honeycomb body and a ring integral with said honeycomb body, said honeycomb body having a surface disposed at right angles to said given flow direction, and said ring including a portion protruding out of said surface; and a grid being permanently secured to the protruding portion downstream of said flow rectifier for generating microscopic eddies in the laminar air flow; said ring including means for fixing and securing a predetermined angle between said honeycomb body an edge surface of the air flow rate meter said flow rectifier in the intake conduit in alignment with the air flow meter said means including elements to individually both center and fix the flow rectifier relative to the air flow rate meter.

* * * * *